(12) United States Patent
Liu

(10) Patent No.: US 12,521,496 B2
(45) Date of Patent: Jan. 13, 2026

(54) SAFETY INJECTOR

(71) Applicant: Yu-Feng Liu, Taipei (TW)

(72) Inventor: Yu-Feng Liu, Taipei (TW)

(73) Assignee: SMAS TECHNOLOGY CO., LTD., Taoyuan (TW)

( * ) Notice: Subject to any disclaimer, the term of this patent is extended or adjusted under 35 U.S.C. 154(b) by 595 days.

(21) Appl. No.: 18/063,693

(22) Filed: Dec. 9, 2022

(65) Prior Publication Data

US 2024/0189520 A1 Jun. 13, 2024

(51) Int. Cl.
*A61M 5/315* (2006.01)
*A61M 5/32* (2006.01)

(52) U.S. Cl.
CPC ...... *A61M 5/3257* (2013.01); *A61M 5/31515* (2013.01)

(58) Field of Classification Search
CPC ............ A61M 5/31515; A61M 5/3243; A61M 5/3275; A61M 5/3293; A61M 5/3221
See application file for complete search history.

(56) References Cited

U.S. PATENT DOCUMENTS

2007/0167909 A1* 7/2007 Lee ..................... A61M 5/3243
604/110

* cited by examiner

*Primary Examiner* — Deanna K Hall

(57) ABSTRACT

A safety injector includes: an injection module having an injection cylinder and a pullable piston rod; a needle module including a needle seat and an injection needle; the needle seat having a seat body and a buckle. In installation state, a safety sleeve covering movably around the injection cylinder between an installation position and a protection position. In the installing position, a first end portion of the safety sleeve is near the buckle and the second end portion thereof is near the handhold portion; while in the protection position, the first end portion is protruded from the injection cylinder for covering the injection needle and the second end portion is near the head portion of the injection cylinder. An inner side of the sleeve body is formed with a first and a second annular flange; and an annular groove is formed therebetween for confining the buckle.

9 Claims, 9 Drawing Sheets

SAFETY INJECTOR

FIELD OF THE INVENTION

The present invention is related to safety injectors, and in particular to a safety injector, in that as disposal of the injection cylinder, a set of needle seat and safety sleeve can be left from the needle seat separately.

BACKGROUND OF THE INVENTION

Recently, to avoid injection needle to hurt medical members or cleaning members so as to induce diseases or infections to these members, safety injection devices are developed so that after the injection cylinders are used, need heads can be isolated for preventing the people from being hurt due to contact the injection cylinder.

In current safety injector, the injection needle is fixed to the injection cylinder. In use, a safety sleeve sleeves the injection needle to avoid to hurt people. Since the injection needle and the safety sleeve are connected to the front end of the injection cylinder, when an injection needle is disposed, it has a large volume which induces difficulty in waste disposal and the risk of un-safety. Furthermore, an injection needle is fixed to the injection cylinder, they being not separable. As a result, the injection cylinder cannot inject drug liquid into a fixed injection device, such as a drip cylinder.

SUMMARY OF THE INVENTION

Accordingly, the object of the present invention is to provide a safety injector, in that the structure of the needle seat 21 and the safety sleeve 3 is simple and can be assembled and operated easily. Furthermore, the structure of needle seat 21 and safety sleeve 3 can be separated with the injection cylinder 11 so that undesired waste can be disposed easily. Furthermore, the present invention can be applied in injection of drug liquid.

To achieve above object, the present invention provides a safety injector, comprising: an injection module including an injection cylinder and a pullable piston rod installed within the injection cylinder; the injection cylinder including a main body, a head portion and a handhold portion; the head portion and the handhold portion being at two ends of the main body, respectively; a needle module including a needle seat and an injection needle; the needle seat having a seat body and a buckle; in installation state, the seat body covering the head portion and holding the injection needle; the buckle being integrally connected to the seat body at an end near the main body and around the seat body; a safety sleeve covering movably around the injection cylinder between an installation position and a protection position; the safety sleeve having a sleeve body, a first end portion, and a second end portion; the first end portion and the second end portion being at two opposite ends of the sleeve body; wherein in the installing position, the first end portion is near the buckle and the second end portion is near the handhold portion; while in the protection position, the first end portion is protruded from the injection cylinder for covering the injection needle and the second end portion is near the head portion; and an inner side of the sleeve body near the second end portion being formed with a first annular flange and a second annular flange; an annular groove; being formed between the first annular flange and the annular second flange; the annular groove being used to confine the buckle so that the safety sleeve and the needle seat are fixed together for separating from the injection cylinder and after separation, the safety sleeve covers the needle seat.

The present invention further provides a needle seat suitable for a safety injector for tightly holding an injection needle and for combining with a safety sleeve; the needle seat comprising: a seat body and a buckle connected to the seat body and surrounding the seat body; and the buckling serving to buckle and fix the safety sleeve.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
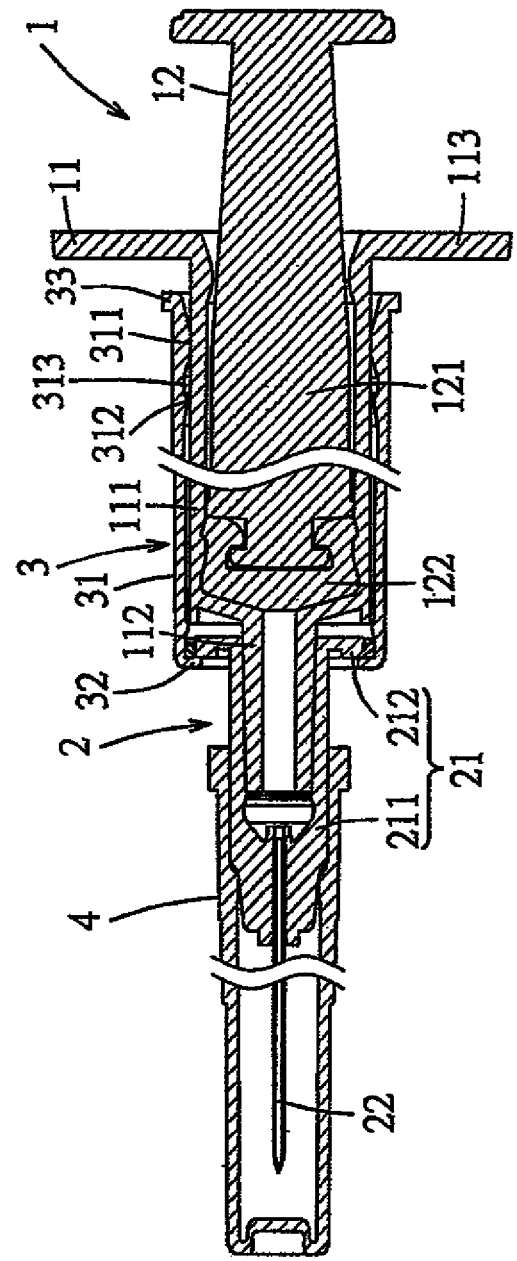
FIG. 1 is a cross sectional view of the safety injector of the present invention, which is in an unused state.

Referring to FIG. 1, the structure of the safety injector according to the present invention is illustrated. The present invention includes the following elements with reference to FIGS. 1, 3 and 5.

An injection module 1 includes an injection cylinder 11 and a pullable piston rod 12 installed within the injection cylinder 11. The injection cylinder 11 includes a main body 111, a head portion 112 and an extended handhold portion 113 at two ends of the main body 111, respectively, and a plurality of ribs 114 protruded from and around a periphery of the main body 111 and adjacent to the handhold portion 113. The piston rod 12 has a rod portion 121 and a piston 122 connected at a front end of the rod portion 121.

Figure 3:
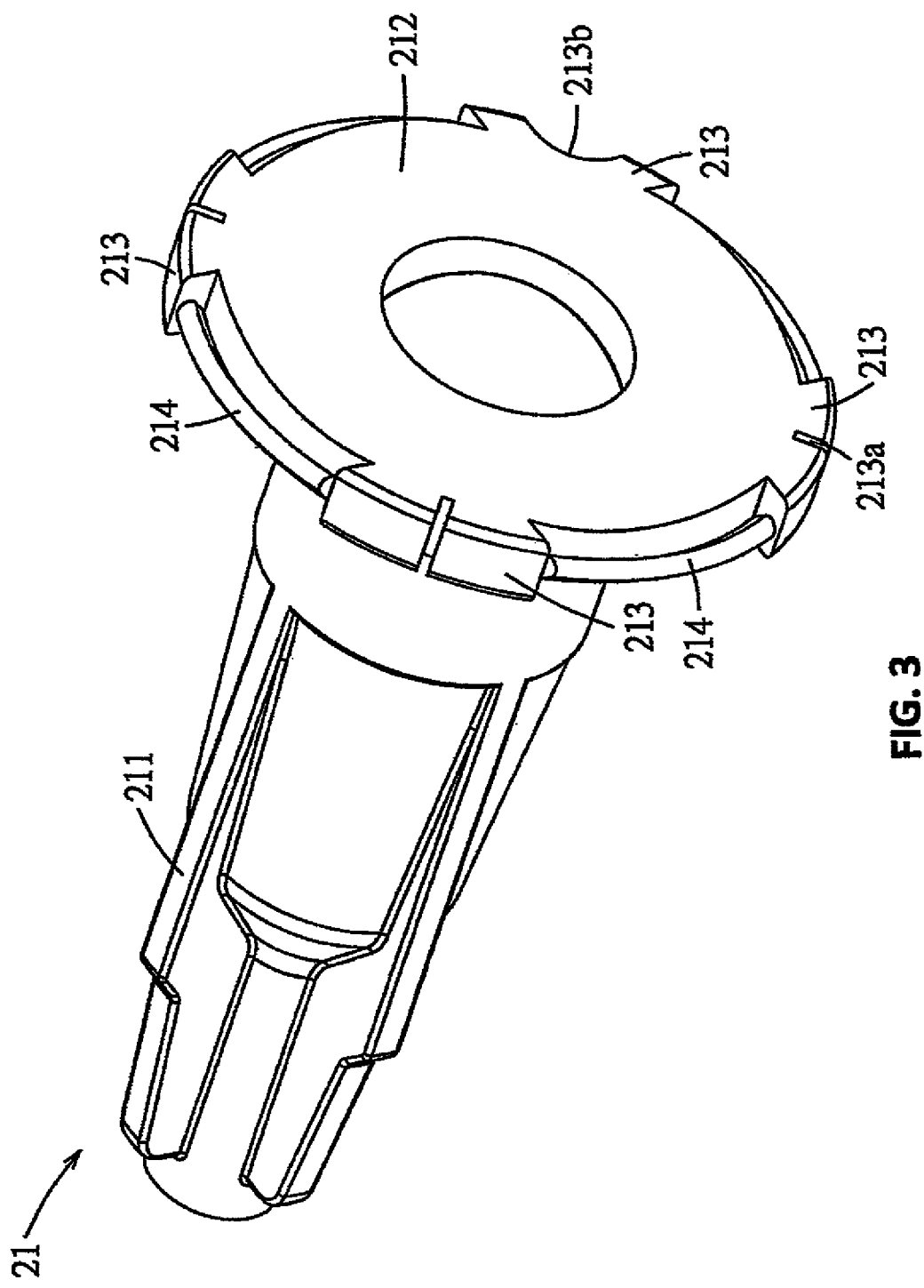
FIG. 3 is a perspective view showing the needle seat of the present invention based on the embodiment shown in FIG. 1.
Figure 4:
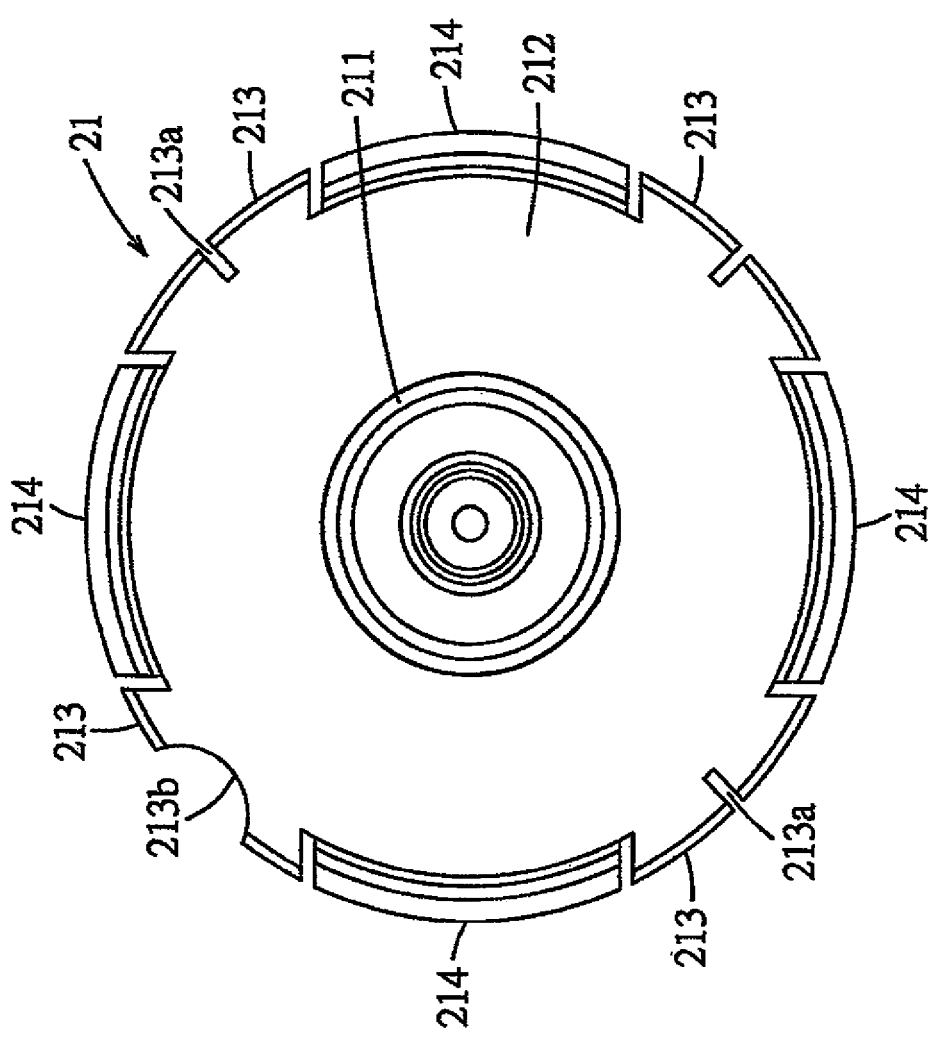
FIG. 4 is a backside view of the needle seat in the embodiment of FIG. 1.
Figure 5:
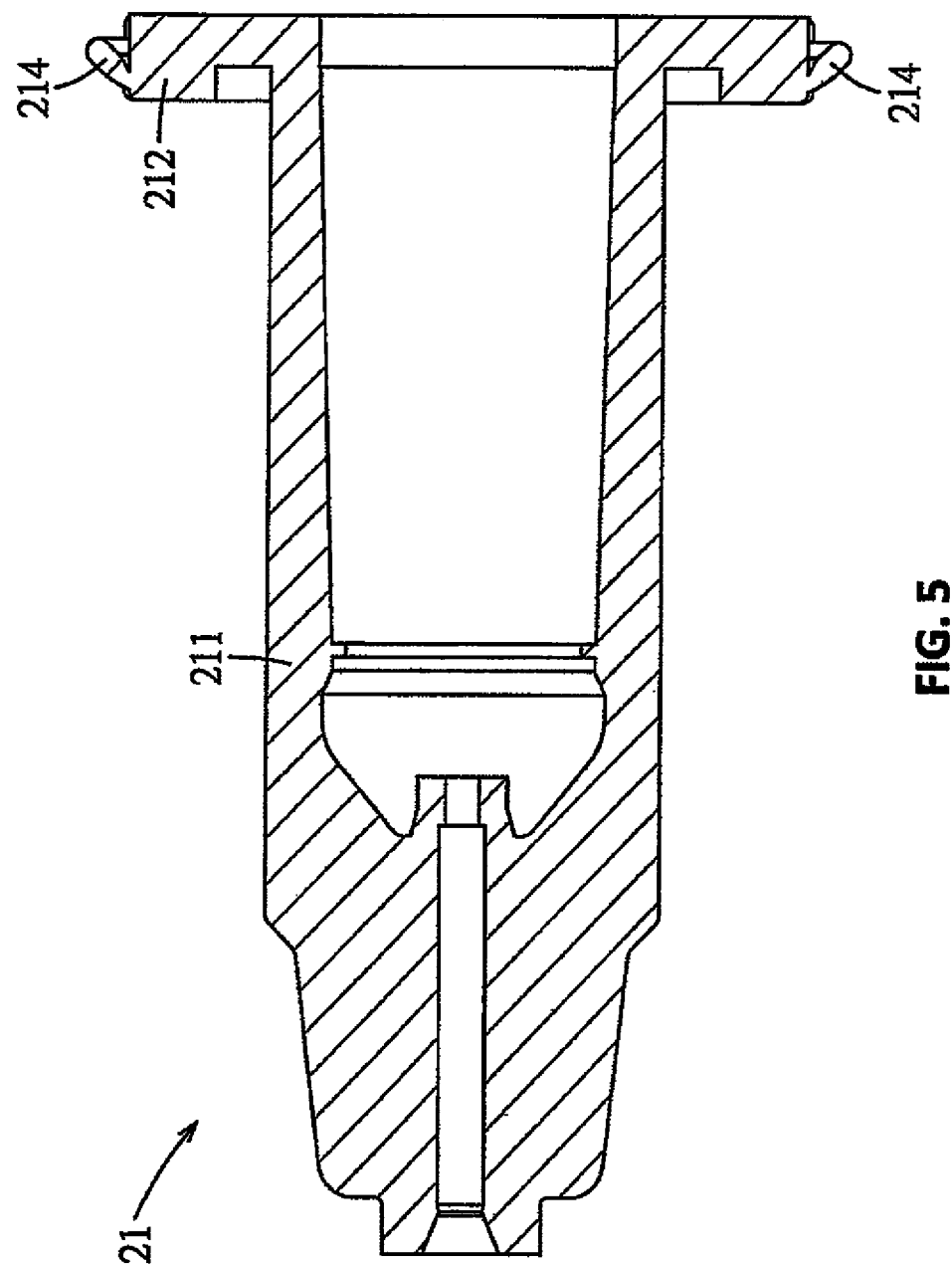
FIG. 5 is a cross section view of the needle seat of the present invention.

Referring to FIGS. 1, 3 and 5, a needle module 2 includes a needle seat 21 and an injection needle 22. The needle seat 21 has a seat body 211 and a buckle 212. In installation state, the seat body 211 covers the head portion 112 and holding the injection needle 22. The buckle 212 is integrally formed with the seat body 211 at an end near the main body 11 and around the seat body 211.

In this embodiment, the buckle 212 is extended with a plurality of buckling blocks 213 around an outer periphery thereof and a plurality of thin portions 214. In FIG. 3, four buckling blocks 213 and four thin portions 214 which are alternatively arranged are shown. In this embodiment, each thin portion 214 is realized by a thin arc so that the buckle 212 can be elastically reduced inwards along a radial direction. That is, the buckle 212 is soft. Each buckling block 213 is formed with at least one recess 213a, 213b. At least one of the recesses 213b has a semi-round shape and other recess 213a is formed as a long deep trench.

Figure 6:
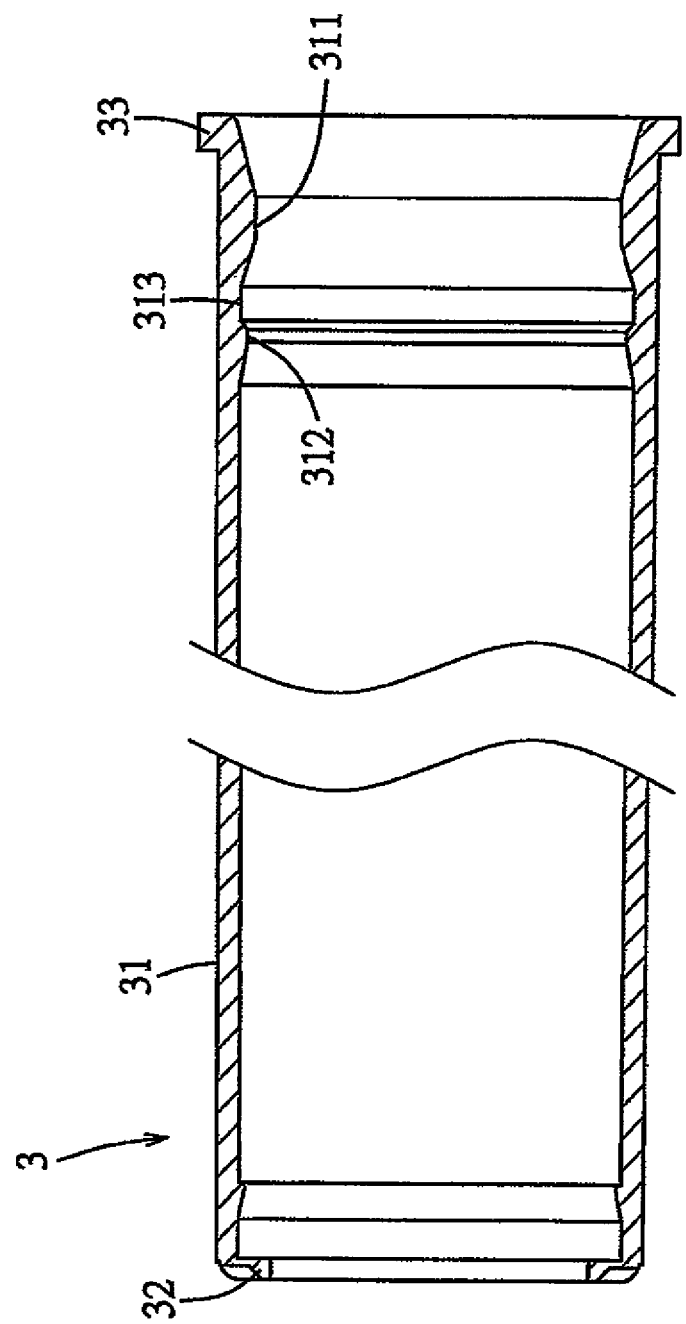
FIG. 6 is a schematic view showing a partial part of the safety sleeve of the present invention.
Figure 7:
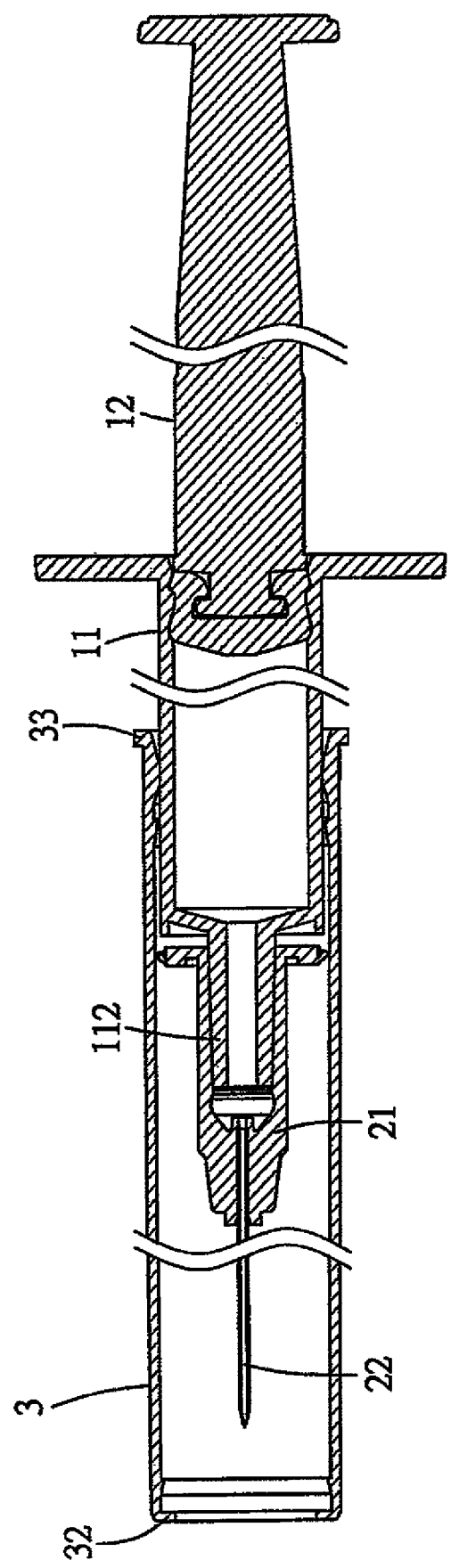
FIG. 7 is a cross section view showing that the safety sleeve of the present invention is in a protection state.

With reference to FIGS. 1, 6 and 7, the safety sleeve 3 sleeves movably around the injection cylinder 11 between an installation position (referring to FIG. 1) and a protection position (referring to FIG. 7). The safety sleeve 3 has a sleeve body 31, a first end portion 32, and a second end portion 33. The first end portion 32 and the second end portion 33 are at two opposite ends of the sleeve body 31. In the installing position, the first end portion 32 being near the buckle 212 and the second end portion 33 being near the handhold portion 113

An inner side of the sleeve body 31 near the second end portion 33 is formed with a first annular flange 311 and a second annular flange 312. An annular groove 313 is formed between the first annular flange 311 and the annular second flange 312. The annular groove 313 serves to confine the buckle 212.

Figure 2:
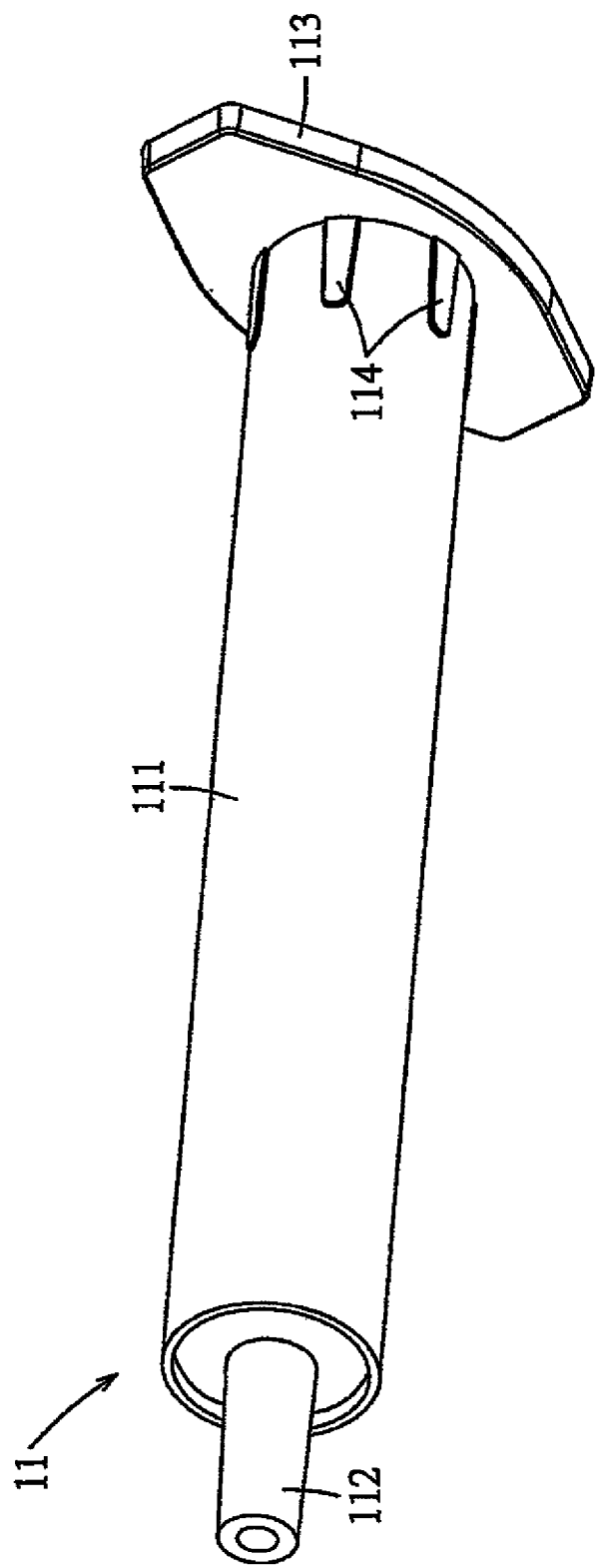
FIG. 2 is a perspective view showing the injection cylinder in the embodiment of FIG. 1 according to the present invention.

Referring to FIG. 1, in installation position, the first end portion 32 is near the buckle 212 and the second end portion 33 is near the handhold portion 113, while the injection needle 22 and the needle seat 21 of the injection needle 22 protrudes outwards from the first end portion 32. In this embodiment, the ribs 114 (referring to FIG. 2) are tightly engaged to the first flange 311 and the second flange 312 so that in installation position, the safety sleeve 3 is tightly engaged to the injection cylinder 11, and the first end portion 32 resists against the buckle 212 of the needle seat 21 for enhancing the structure of the needle seat 21 to prevent the needle seat 21 from separating with the injection cylinder 11. In detail, in FIG. 1, in the unused state of the safety injector, the safety sleeve 3 is in the installation position, and the cover 4 covers upon the needle seat 21 for enclosing the injection needle 22. If it is necessary to use the safety injector of the present invention, the cover 4 is removed.

Referring to FIG. 7, in use, the medical member removes the cover 4. By using the piston rod 12 to fill drug liquid into the injection cylinder 11, the safety sleeve 3 is moved to a protection position. In the protection position, the first end portion 33 is more near the head portion 112 to avoid the injection needle 22 to hurt medical members. In injection, the safety sleeve 3 is moved back to the installation position. Referring to FIG. 3, air could flow through the semi-round concave portion 213b of the needle seat 21 so that when the safety sleeve 3 moves between the installation position and the protection position, it is not affected. Therefore, the movement is smooth.

Figure 8:
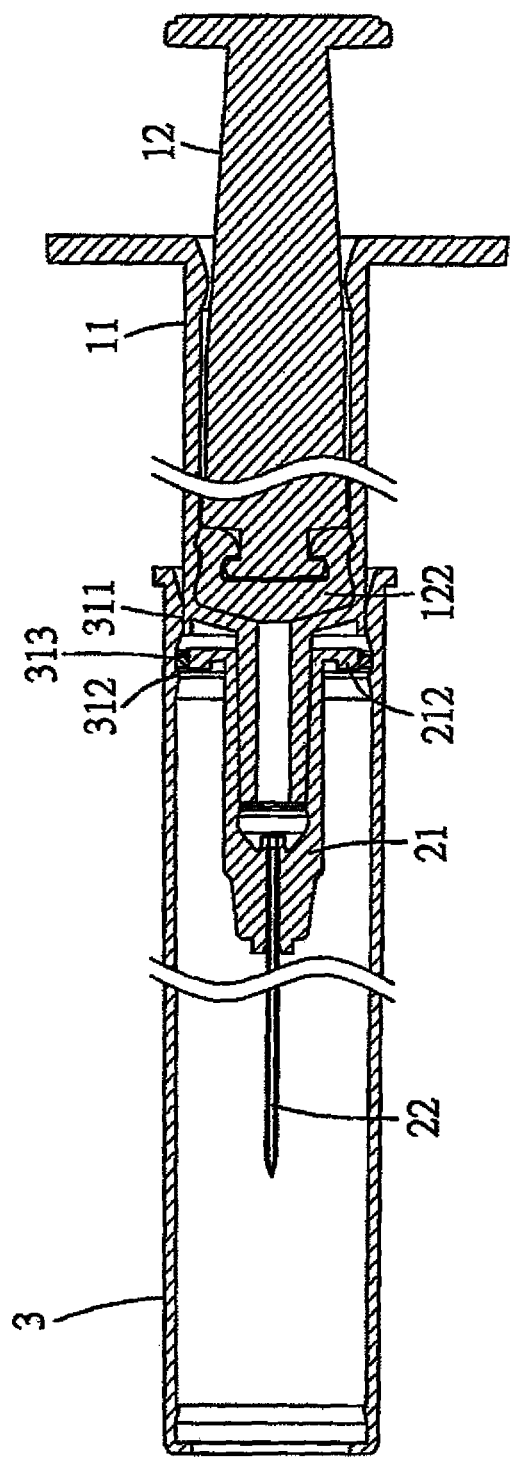
FIG. 8 is a cross section view showing the safety sleeve of the present invention, where the safety sleeve is fixed to the needle seat and does not separate with the injection cylinder.
Figure 9:
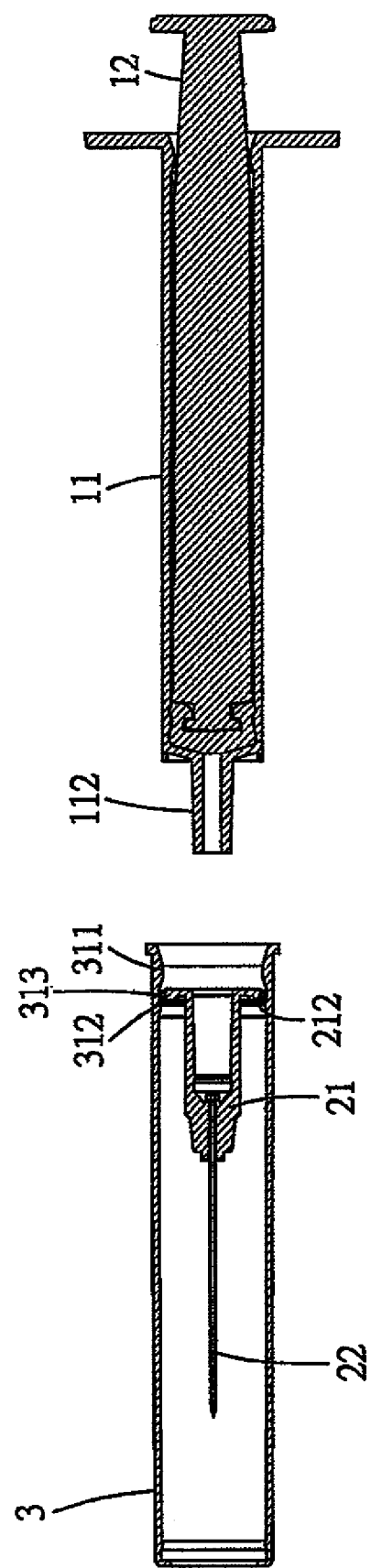
FIG. 9 is a cross section view of the present invention, where the safety sleeve is fixed to the needle seat, while being separate with the injection cylinder.

With reference to FIGS. 3, 8 and 9, when injection is finished, the safety sleeve 3 is pulled out to cause the second flange 312 goes through the buckle 212 and the buckle 212 is recessed in the annular groove 313 so that the annular groove 313 receives the buckle 212. Thereby, the safety sleeve 3 and the needle seat 21 can separate from the injection cylinder 11 integrally and the safety sleeve 3 covers the injection needle 22. In detail, when the second flange 312 moves over the buckle 212, the thin portions 214 causes that the buckle 212 to be easily deformed elastically so that the second flange 312 moves easily. After the second flange 312 moves through the buckle 212, the buckling blocks 213 is buckled in the annular grooves 313 so that the safety sleeve 3 is fixed to the needle seat 21 and the safety sleeve 3 covers completely the injection needle 22 so as to isolate the injection needle 22 from hurting anybody.

Next, the medical members pulls the needle seat 21 with the safety sleeve 3 to leave from the head portion 112, so that the needle seat 21 is separated from the injection cylinder 11 to be thrown away (see FIG. 9). Thus, the length of undesired safety injector is reduced. Thereby, disposal of the injection cylinder 11 and the set of needle seat 21 and safety sleeve 3 can be done separately. If it is desired to inject drug liquid into a fixed injection device by using the injection cylinder 11, similarly, the needle seat 21 with the safety sleeve 3 is separated from the injection cylinder 11.

In summary, the structure of the needle seat 21 and the safety sleeve 3 is simple and can be assembled and operated easily. Furthermore, the structure of needle seat 21 and safety sleeve 3 can be separated with the injection cylinder 11 so that undesired waste can be disposed easily. Furthermore, the present invention can be applied in injection of drug liquid.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A safety injector, comprising:
an injection module including an injection cylinder and a pullable piston rod installed within the injection cylinder; the injection cylinder including a main body, a head portion and a handhold portion; the head portion and the handhold portion being at two ends of the main body, respectively;
a needle module including a needle seat and an injection needle; the needle seat having a seat body and a buckle; in installation state, the seat body covering the head portion and holding the injection needle; the buckle being integrally connected to the seat body at an end near the main body and around the seat body;
a safety sleeve covering movably around the injection cylinder between an installation position and a protection position; the safety sleeve having a sleeve body, a first end portion, and a second end portion; the first end portion and the second end portion being at two opposite ends of the sleeve body; wherein in the installing position, the first end portion is near the buckle and the second end portion is near the handhold portion; while in the protection position, the first end portion is protruded from the injection cylinder for covering the injection needle and the second end portion is near the head portion; and
an inner side of the sleeve body near the second end portion being formed with a first annular flange and a second annular flange; an annular groove; being formed between the first annular flange and the annular second flange; the annular groove being used to confine the buckle so that the safety sleeve and the needle seat are fixed together for separating from the injection cylinder and after separation, the safety sleeve covers the needle seat.

2. The safety injector as claimed in claim 1, wherein a plurality of ribs protruded from and around a periphery of the main body and adjacent to the handhold portion, the ribs are tightly engaged to the first flange and the second flange so that in installation position, the safety sleeve is tightly engaged to the injection cylinder.

3. The safety injector as claimed in claim 1, wherein in the installation position, the first end portion resists against the buckle of the needle seat for enhancing the structure of the needle seat to prevent the needle seat from separating with the injection cylinder.

4. The safety injector as claimed in claim 1, wherein buckle is extended with a plurality of buckling blocks and a plurality of thin portions around an outer periphery thereof, the plurality of buckling blocks and the thin portions are alternatively arranged.

5. The safety injector as claimed in claim 4, wherein each buckling block is formed with at least one semi-round recess.

6. The safety injector as claimed in claim 4, wherein each buckling block is formed with at least one long deep trench.

7. A needle seat suitable for a safety injector for tightly holding an injection needle and for combining with a safety sleeve; the needle seat comprising:

a seat body and a buckle connected to the seat body and surrounding the seat body; and the buckling serving to buckle and fix the safety sleeve; wherein the buckle is extended with a plurality of buckling blocks and a plurality of thin portions around an outer periphery thereof, the plurality of buckling blocks and the thin portions are alternatively arranged.

8. The safety injector suitable for a safety injector as claimed in claim 7, wherein each buckling block is formed with at least one semi-round recess.

9. The safety injector suitable for a safety injector as claimed in claim 7, wherein each buckling block is formed with at least one long deep recess.

* * * * *